(12) United States Patent
Guttenberger et al.

(10) Patent No.: US 6,341,536 B1
(45) Date of Patent: Jan. 29, 2002

(54) ACTUATING MECHANISM FOR MOTOR VEHICLES

(75) Inventors: Richard Guttenberger, Greding; Werner Seichter, Georgensgmünd, both of (DE)

(73) Assignee: Bühler Motor GmbH, Nürnberg (DE)

( * ) Notice: Subject to any disclaimer, the term of this patent is extended or adjusted under 35 U.S.C. 154(b) by 0 days.

(21) Appl. No.: 09/559,398

(22) Filed: Apr. 26, 2000

(30) Foreign Application Priority Data

Apr. 29, 1999 (DE) .......................................... 199 19 529

(51) Int. Cl.⁷ .............................................. F16H 27/02
(52) U.S. Cl. ..................... 74/89.18; 74/89.19; 74/502.1; 359/874; 359/877
(58) Field of Search ........................... 74/89.18, 89.19, 74/502.1; 359/844, 849, 865, 874, 877

(56) References Cited

U.S. PATENT DOCUMENTS

| | | |
|---|---|---|
| 4,101,206 A | 7/1978 | Oskam et al. |
| 4,628,760 A | * 12/1986 | Huddleston ................ 74/501 R |
| 5,969,891 A | * 10/1999 | Otenio et al. ................ 359/871 |
| 6,164,148 A | * 12/2000 | Brouwer ..................... 74/89.14 |

FOREIGN PATENT DOCUMENTS

| | | |
|---|---|---|
| DE | 30 26 561 | 2/1981 |
| JP | 62-31540 | * 2/1985 |
| WO | WO 95/05295 | 2/1995 |
| WO | WO 98/31565 | 7/1998 |

* cited by examiner

*Primary Examiner*—David Fenstermacher
(74) *Attorney, Agent, or Firm*—Jacobson Holman, PLLC

(57) ABSTRACT

An actuating mechanism for a motor vehicle, wherein a first element can be fastened to a vehicle; and a second element, which is connected to the first element so as to swivel around at least one axis of rotation, exhibits a mounting for a manipulatable member. The second element is connected to at least one adjustable element, which can be actuated by a drive between the first and the second element, and to at least one friction element, which rests against the first element. The actuating mechanism may be used with a rearview mirror to provide an especially high controlling torque and a frictional force that is as constant as possible over its life time, whereby the number of parts is kept to a minimum and the assembly is especially simple. At least one friction element and one adjustable element form a one piece friction-adjustable element, which serves as the connecting element between the first and the second elements, and the friction-adjustable element is under a tensile load.

54 Claims, 10 Drawing Sheets

ACTUATING MECHANISM FOR MOTOR VEHICLES

FIELD OF THE INVENTION

The invention relates to an actuating mechanism for a motor vehicle, wherein a first element can be fastened to a vehicle; and a second element, which is connected to the first element so as to swivel around at least one axis of rotation, includes a mounting for a manipulatable member. The second element is connected to at least one adjustable element, which can be actuated by a drive between the first and the second element, and to at least one friction element, which rests against the first element.

BACKGROUND OF THE INVENTION

DE-PS 30 26 561 discloses an actuating mechanism, for whose adjustment around two vertical axes there are adjustable elements in the form of racks, which are actuated by a drive, and for whose improved vibration damping there are friction elements in the form of spherical disk segments.

The known mirror adjustment exhibits the drawback that the adjustable elements are housed inside the drive housing and thus are located at a relatively short distance from the axes of rotation. Therefore, the controlling torque, exerted by the drive on the actuating mechanism, is also relatively low. Another drawback lies in the undefined friction forces, which are generated by the spherical dish segments. Since they are made of plastic, their elastic effect can decrease over the course of time.

SUMMARY OF THE INVENTION

Therefore, it is the object of the present invention to provide for the aforementioned class of rearview mirrors an especially high controlling torque and a frictional force that is as constant as possible over its life time, whereby the number of parts is kept to a minimum and the assembly is especially simple.

This problem is solved by the invention in that at least one friction element and one adjustable element form a one piece friction-adjustable element, which serves as the connecting element between the first and the second element, and the friction-adjustable element is under a tensile load.

Since the friction-adjustable elements are arranged on the outside of the first element, it is possible for the controlling torque to be especially high. Hence the large radius of friction is especially appropriate for damping the vibration and the holding force is very high. The tensile load further increases the positive effects, because zero tolerance is produced.

Preferably the friction-adjustable element consists of a metal band or a composite part with at least one toothed region, since this design makes it especially easy to manufacture, and it exhibits adequate strength. The teeth can be cut into the metal band by perforation, drawing or punching. The friction-adjustable element can also be designed as an engineering plastic part, especially if the quality of the teeth must meet special requirements. Preferably at least one friction-adjustable element is connected to the second element at connecting points.

A second solution to the problem includes a chain with a number of links forms the adjustable element and the friction element, wherein the chain is under tensile stress. The chain exhibits the advantage that it can be moved in all directions, thus following the movements of an adjustable element in all directions.

Preferably the drive engages in or between the chain links in order to produce a drive coupling, thus eliminating the need of impressing separate teeth. To swivel the second element around two axes of rotation that are vertical to each other, there are two friction-adjustable elements or two chains.

A preferred improvement of the invention embodies the feature that the two friction-adjustable elements can be driven independently of each other. Each friction-adjustable element is connected to the second element at at least two of the connecting points. When using two connecting points per friction-adjustable element, one connecting point of the second element with the first friction-adjustable element is followed by a connecting point of the second element with the second friction-adjustable element, whereby the connecting points are spaced uniformly apart at an angle of 90° with respect to an intersection of both axes of rotation. Each friction-adjustable element encloses the first element; and the friction-adjustable elements are guided at least partially in or at the first element.

Since the friction-adjustable elements can be driven independently of each other, the teeth are easy to design because there are no or only few nonaxial movements. The first element can be enclosed by the two connecting points of the friction-adjustable elements with the second element with the result that the second element is held securely at the first element. To lock the friction-adjustable elements in position, guides are provided in or at the first element.

Since the two friction-adjustable elements cross at one point, it is necessary to form the first element in such a manner that the two friction-adjustable elements do not impede one another. The same effect can be achieved through a suitable design of the friction-adjustable elements. In particular the use of thin metal bands eliminates impedance between the two friction-adjustable elements, even if they slide over one another. Thus the first element is especially easy to design. The two friction-adjustable elements can also be in essence uniformly spaced apart relative to the intersection of the axes of rotation.

When using large friction-adjustable elements, it may become necessary to arrange the two friction-adjustable elements on different rails and at least partially at varying distances from the intersecting point of the axes of rotation so that they do not impede each other.

It is especially advantageous to allow tensile forces to act on the friction-adjustable elements not only when standing still but also in operation, thus ruling out any play between the first and the second element. The tensile forces can be achieved, for example, by designing at least one friction-adjustable element with a springy region. In particular it is desirable to design the springy region as a wave, since the desired maximum range of the spring can be accurately set. In the assembled state, the springy region is completely stretched in order to exclude as much as possible dead travel in operation.

According to another important feature of the invention, the second element is designed essentially rigid, thus significantly suppressing vibrations of the manipulatable member.

An improvement of the invention provides the second element with an annular rim/an annular wall, which has a special reinforcing effect on the second element.

On this rim/wall are moulded the connecting points to the at least one friction-adjustable element. Thus the adjusting forces are transferred optimally to the entire second element.

According to an especially easy to assemble improvement of the invention the connecting points are designed in the form of a catch projecting from the ring interior. Moreover, these catches have the shape of circular segments with the result that the center points of the circular segments can lie on the axes of rotation. Thus the friction-adjustable elements can make swivel movements and large torques can be transferred.

Since the second element has spring members, to which the connecting points between the friction-adjustable elements and the second element can be moulded, the friction-adjustable element can be designed without a springy region. The spring members can be simply designed by affixing a slotted recess in the second element.

At least one friction-adjustable element is hinged to the second element, thus eliminating the need for the friction-adjustable element to be provided with an arched toothing. To reduce the weight of the second element and make it easy to produce, yet ensure adequate strength, the second element can be designed as an aluminum drawn part, an aluminum cast part or a magnesium diecast part.

A design with especially few components is achieved in that there are no attachment means between the first and second element. This is possible because the friction-adjustable elements suffice as attachment elements. To ensure that the first and the second element lock there is a spherical cap provided with guides and grooves. This locking mechanism enables a reliable and accurate positioning.

Expediently the first element includes recesses, by means of which gear members of the drive can engage with the one piece friction-adjustable elements.

Owing to the special geometric features for adjusting the adjustable element around two axes of rotation that are perpendicular to each other, it may be necessary for specific settings to design the friction-adjusting members flexibly at a right angle to the adjustment direction so that the friction-adjustable elements can be fixed with the second element on the side of the connecting points. However, in the case of a rigid design, the friction-adjustable elements must be able to escape sideways in the connecting points.

Owing to the geometric features, the angles of the friction-adjustable elements in the extreme positions of the second element can deviate slightly from 90°. Therefore, it may or may not be necessary in a rigid design that at least one friction-adjustable element has the option of escaping sideways with the second element at at least one connecting point.

In the case of anointed connection of the friction-adjustable element with the second element, it is expedient for the friction-adjustable elements to be guided in guides on the side of the first element. Preferably there are guides on both sides.

If at least one of the friction-adjustable elements is positioned in the guides so that they can be moved lengthwise with little or only very little play sidewalks, this configuration then ensures locking between the first element and the second element. An additional locking mechanism is thus superfluous. In order not to limit the mobility of the second element with respect to the first element, at least one friction-adjustable element can be moved longitudinally in the guides and can be moved slightly sideways. Hence, the guides can be designed at least in part as a groove.

The toothed region of at least the friction-adjustable element can face the first element or be arranged at approximately 90° thereto. Thus different types of gear designs can be used. It is also possible to have at lest one part of a friction-adjustable element, which carries the toothed region, project into the interior of the first element.

To prevent the friction-adjustable element and the gear member from disengaging under a large load or when actuating the drive at an end stop of the mirror, at least one friction-adjustable element can be braced with a bracing member at least in the region of engagement with the gear member.

If, on the other hand, such a bracing member is omitted, the gear member can possibly jump at a high load into the toothed region of the friction-adjusting member. Thus an additional overload coupling is superfluous.

The friction-adjustable element can be braced in that a bracing element reaches behind it at least partially. In this respect the bracing element can also be designed as a snap connection. This design facilitates the assembly of the friction-adjustable element, especially if the snap connection is designed in the shape of snap hooks. The guide and/or the snap connection is/are designed as one piece with the first element. The bracing members are designed preferably as one piece with the first element or as one piece with the second element.

Another possibility to simplify the assembly is to connect the bracing member to the first element with a film hinge. In this respect the bracing member is held by a snap connection in its final assembled position.

To facilitate the assembly of the friction-adjustable elements, a spring element can be arranged between the first element and the second element. In the simplest case this spring element is designed as one piece with the first element or the second element, but a spring element can also be provided. In this case the spring element endeavors to push the second element away from the first element; and at least one friction-adjustable element holds the second element against the spring action of the spring element at the first element. During assembly of the friction-adjustable element, the second element can be forced against the spring action against the first element by means of an assembly tool. In this manner it is easier to connect the ends of the friction-adjustable element to the projecting catch on the second element. Following assembly, the spring provides for zero tolerance between the first and the second element and between the friction-adjustable element and the first as well as the second element. A similar simplified assembly can also be achieved if a friction-adjustable element is provided with a springy region, or if the second element is designed as a spring member in the region of the connecting points.

To design the actuating mechanism with memory, it is proposed that the wall of the first element be provided with recesses, by means of which at least one position finder can be coupled with the friction-adjustable elements. In this case one part of the position finder can be arranged inside the first element; and a second part can be permanently connected to a friction-adjustable element, with the result that a connection can be produced between the two parts by means of the wall of the first element.

Another possibility of assembling a memory device is to retrofit the position finder on the first element from the outside and to connect it both mechanically and electrically to the first element. Thus a modular design is produced that permits a smaller inventory of different types of drives or drive parts.

The possibility of realizing the electrical connection between the position finder and the mirror attachments by means of sheet metal guides has proven to be especially advantageous. In this case the sheet metal guides can be formed by injection in the first element.

The actuating mechanism of the invention is especially suitable for actuating a rearview mirror of a motor vehicle.

DETAILED DESCRIPTION OF THE PREFERRED EMBODIMENTS

Figure 1:
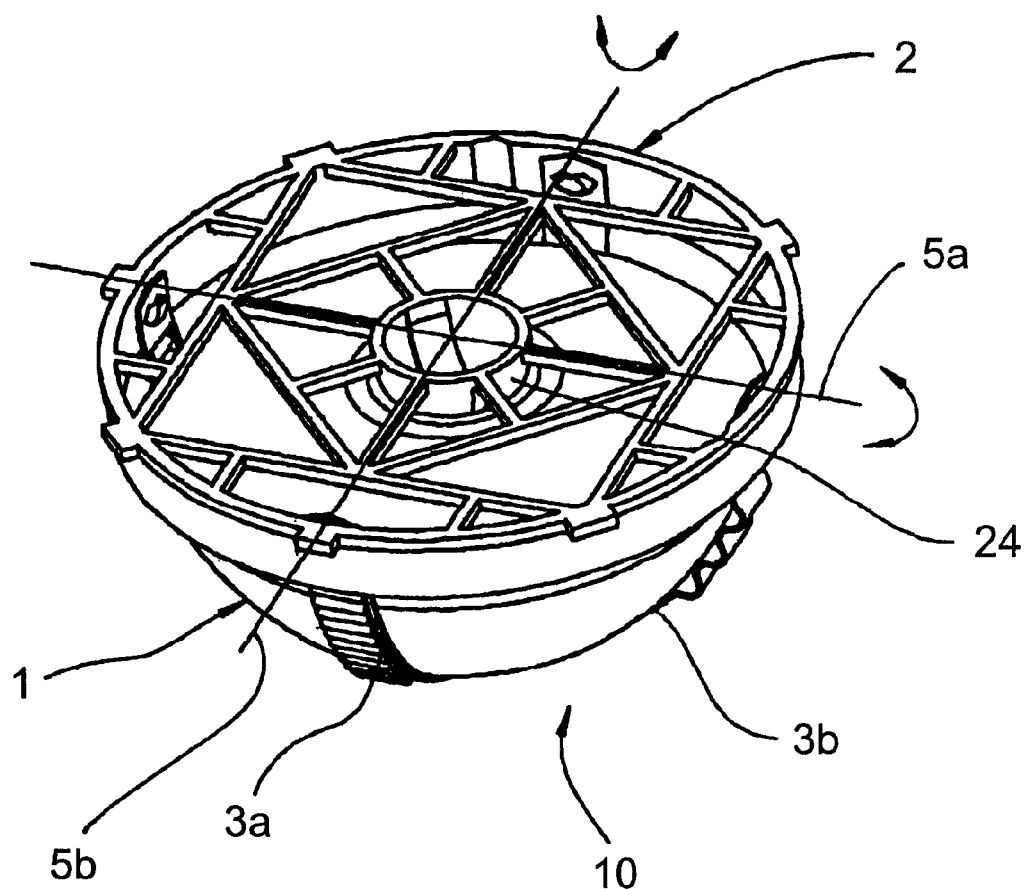
FIG. 1 is a simplified spatial drawing of an actuating mechanism with a first and a second element.

FIG. 1 depicts an actuating mechanism 10, comprising a first element 1, a second element 2, which can be swivelled by two friction-adjustable elements 3a, 3b around two axes of rotation 5a, 5b that are at a right angle to each other. The first element 1 is mounted in a swivel bearing 24 on the second element 2. The first element is designed preferably as a two part housing.

Figure 2:
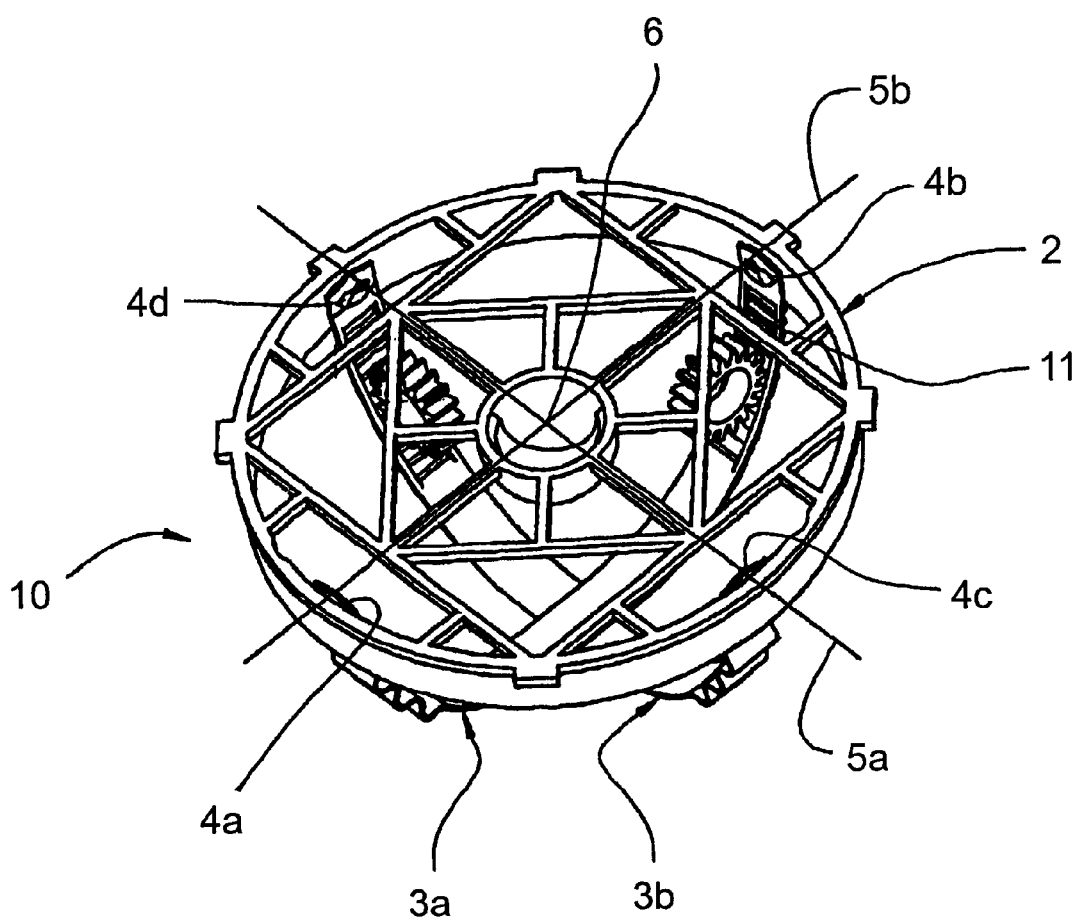
FIG. 2 is another simplified spatial drawing of a part of the actuating mechanism.

For the sake of a better overview, FIG. 2 shows the same actuating mechanism 10 without the first element. FIG. 2 depicts the friction-adjustable elements 3a, 3b, which are connected to the second element 2 at the connecting points 4a, 4b, 4c, 4d. In this case one connecting point 4a, 4b of the friction-adjustable element 3a is followed by a connecting point 4c, 4d of the friction-adjustable element 3b with the second element; and the distances between the connecting points 4a, 4b, 4c, 4d are distributed uniformly around an intersecting point 6 of the axes of rotation 5a, 5b. Furthermore, gear mechanisms are depicted in the form of gear wheels, which engage, as a part of the drive to actuate the friction-adjustable elements 3a, 3b, in the toothed regions 11 of the friction-adjustable elements 3a, 3b.

Figure 3:
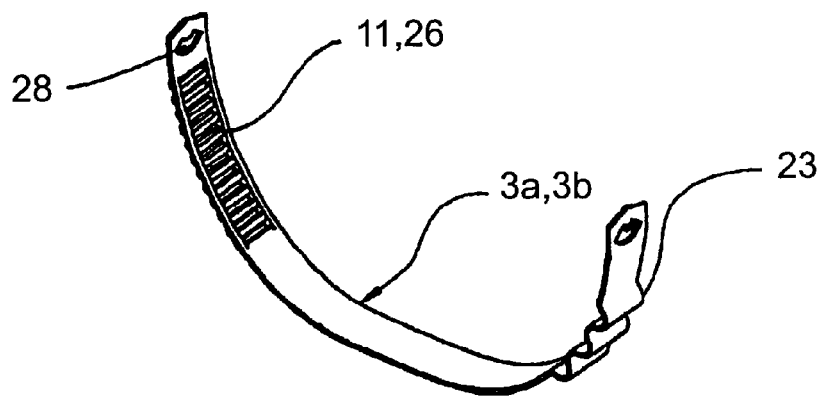
FIG. 3 is a friction-adjustable element in the form of a metal band with teeth.

FIG. 3 depicts an embodiment for the friction-adjustable element 3a, 3b comprising the toothed region 11, which is designed as an impressed toothing 26, connecting openings 28, which are designed in the shape of circular segments, and a springy region 23, which is wave shaped.

Figure 4:
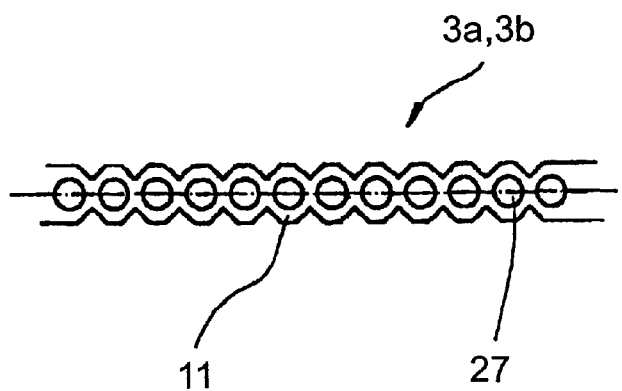
FIG. 4 depicts a first version of the metal band.
Figure 5:
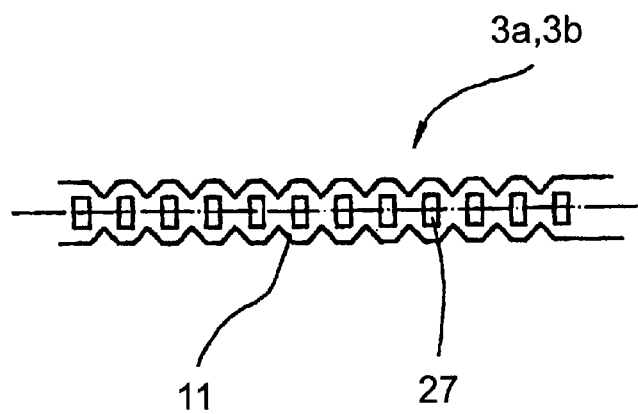
FIG. 5 depicts a second version of the metal band.

FIGS. 4 and 5 depict versions of the toothed region 11 of the friction-adjustable elements 3a, 3b, where the teeth are designed as a perforation 27. In FIG. 4 the perforation 27 is round; in FIG. 5, rectangular.

Figure 6:
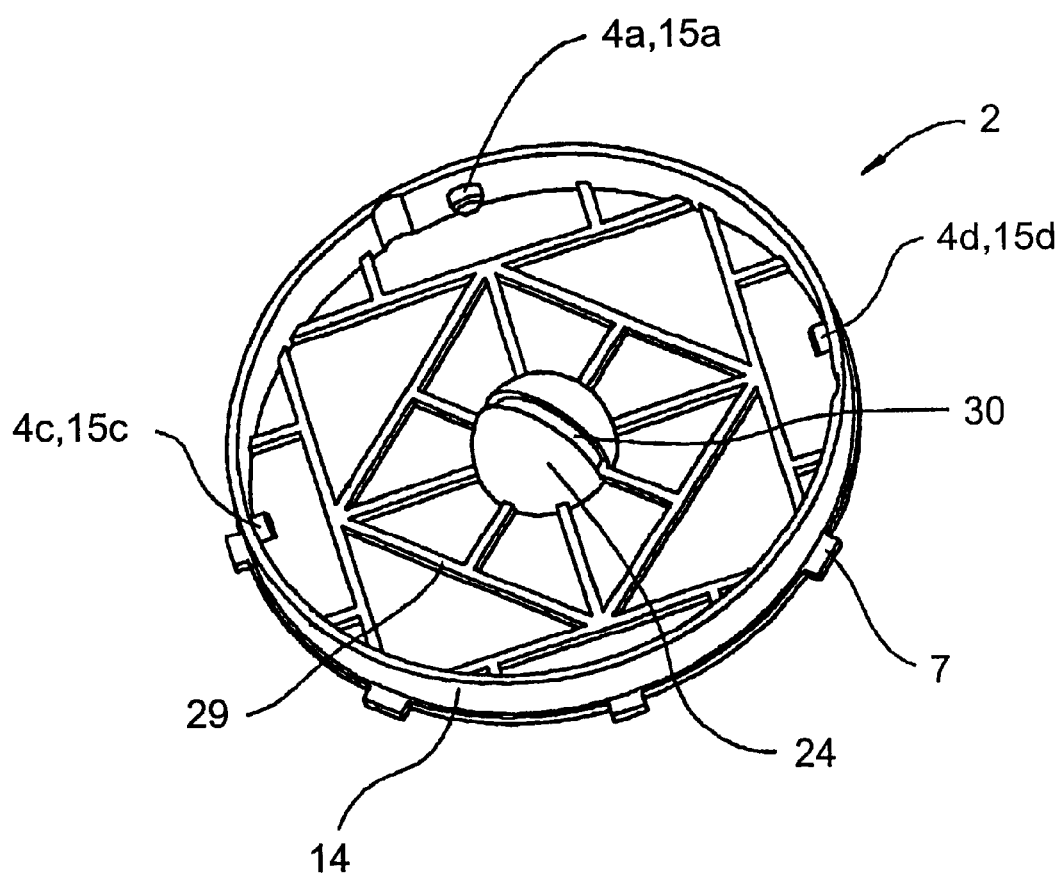
FIG. 6 is a spatial drawing of the second element.

FIG. 6 shows the second element 2, which is designed as a drawn aluminum part, comprising an annular rim/wall 14, swivel bearing 24, mounting 7 for an adjustable element, like a mirror (usually with mirror glass carrier), connecting points 4a, 4b, 4c, 4d, and braces 29 to connect the annular rim/wall 14 to the swivel bearing 24. The connecting points 4a, 4b, 4c, 4d are designed in the form of catches 15a, 15b, 15c, 15d, which project from the inside of the annular rim/wall 14 and which are designed in the shape of circular segments, so that the respective points of rotation of the connecting points 4a, 4b, 4c, 4d lie on the corresponding axes of rotation 5a, 5b. In mirror drives, the axes of rotation are supposed to lie as close as possible to the reflecting surfaces. The swivel bearing 24 is provided with a groove 30, which is part of a locking mechanism.

Figure 7:
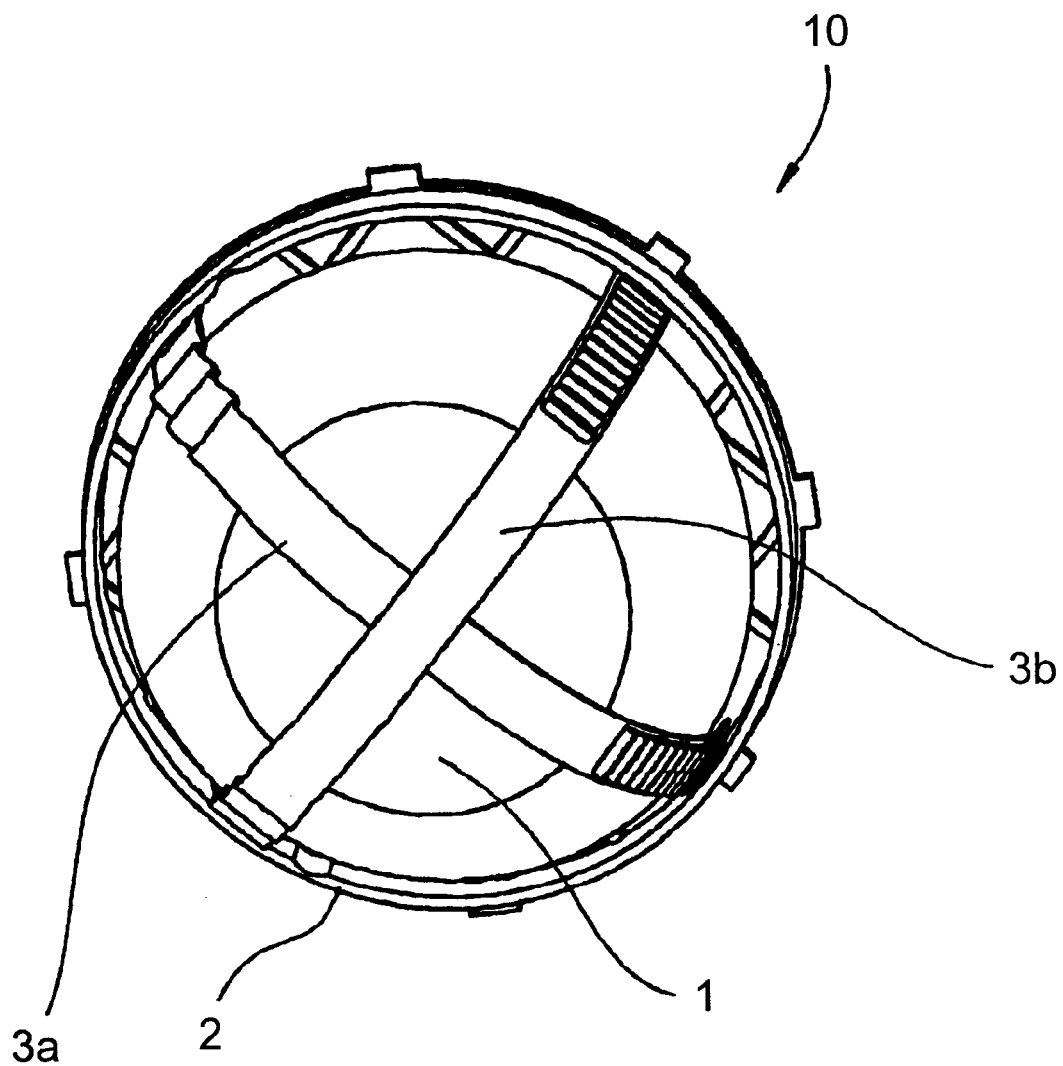
FIG. 7 is a second spatial drawing of the actuating mechanism from another perspective.

FIG. 7 depicts a second spatial drawing of the actuating mechanism 10 from a different perspective. Here the friction-adjustable elements 3a, 3b are wrapped around the first element 1 and connected to the second element 2. In this case the friction-adjustable elements are guided in such a manner that they cannot impede each other. Furthermore, the attachment means can serve as attachment eyes to fasten the actuating mechanism to a part that is rigidly mounted on the chassis.

Figure 8:
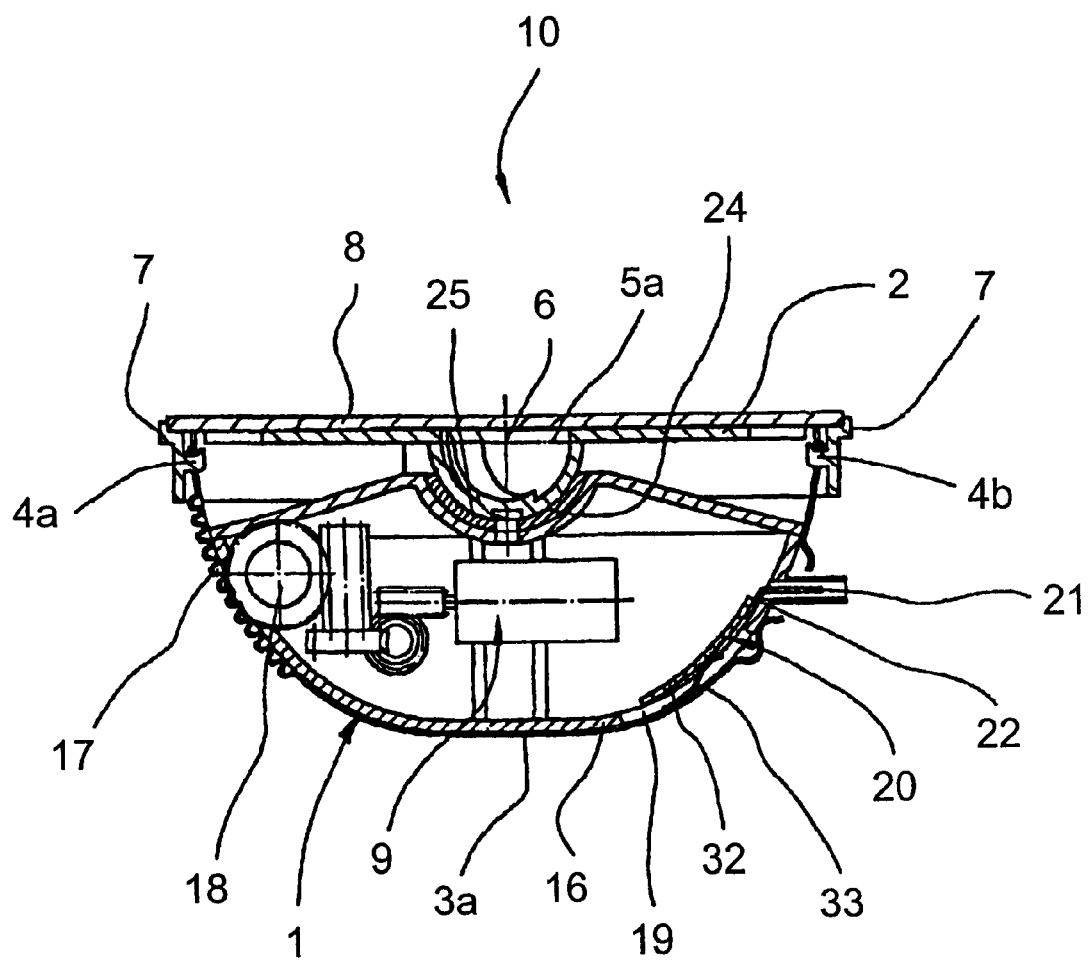
FIG. 8 is a simplified sectional view of the actuating mechanism.

FIG. 8 is a simplified sectional view of the actuating mechanism 10, comprising the two piece first element 1, the second element 2, the intersecting point 6 of the axes of rotation 5a, 5b, the drive motor 9 with the gear mechanism 18, which engages by means of a recess 17 for the gear mechanism in a wall 16 of the first element 1 with the toothed region of the friction-adjustable element 3a. In this case the friction-adjustable element 3a is wrapped around the first element 1, which is shaped at least in part as a sphere and/or cylinder, and is connected to the second element by means of connecting points 4a, 4b.

FIG. 8 also shows the swivel bearing 24 with a spherical cap 25 and the mounting 7 for the manipulatable member 8 on the second element 2, as well as a position finder 20, which comprises the friction-adjustable element 3a or a part attached thereto, for example, a slider 33, which is guided through a recess 19 for the position finder in the wall 16, and a component, mounted rigidly in the first element 1, e.g. a printed circuit board 32 with potentiometer paths. The electrical connections to a connector 21 can occur over sheet metal guides 22, which are formed, for example, by injection in the first element 1.

Figure 9:
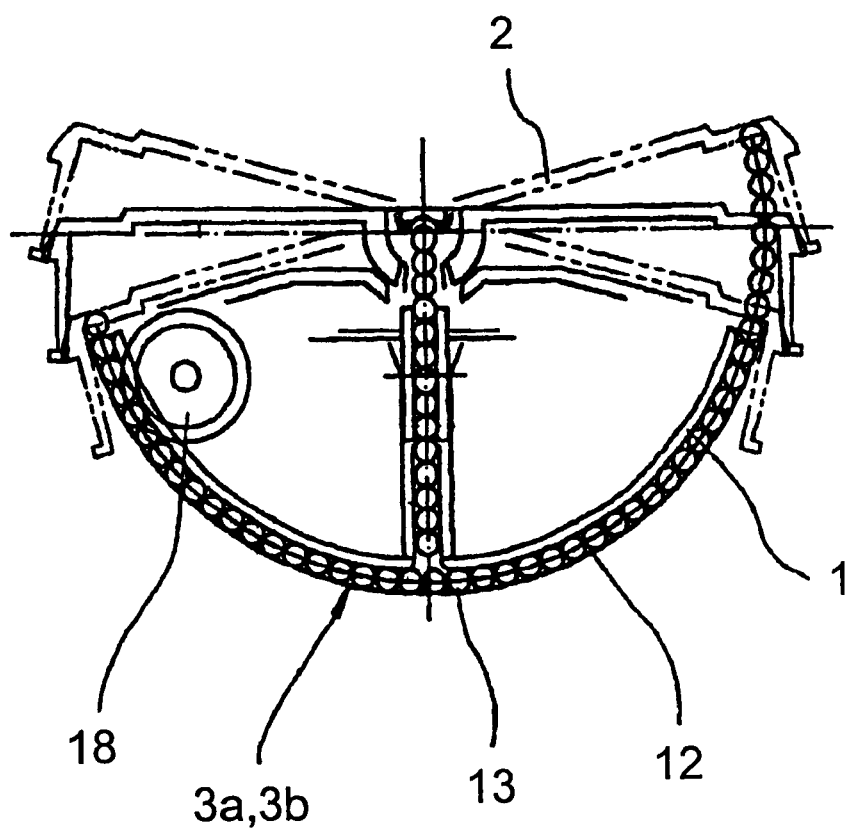
FIG. 9 is a second design embodiment of the invention.

FIG. 9 depicts a second embodiment of the invention, in which a chain 12, consisting of a plurality of chain links 13, e.g. ball chain, is used as the friction-adjustable element 3a, 3b. In this case the shape of the chain links form the teeth, with which the gear mechanism 18 engages directly.

Figure 10:
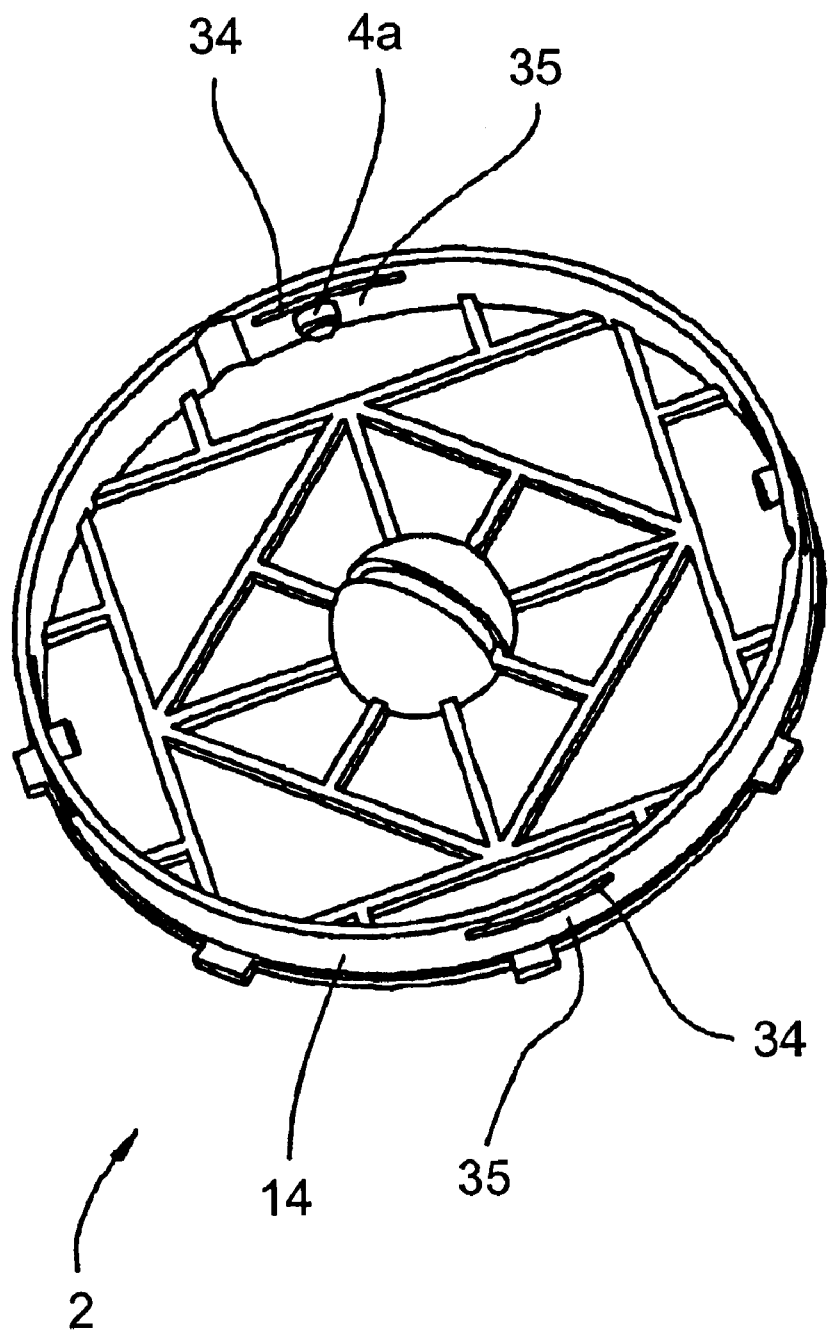
FIG. 10 is a spatial drawing of a version of the second element.

FIG. 10 depicts a version of the second element 2, in whose annular rim/wall 14 the recesses 34 are moulded. In this manner spring mechanisms 35 are produced that are provided with connecting means 4a, 4b, 4c, 4d. Thus there is no need to provide springy regions for the friction-adjustable elements.

Figure 11:
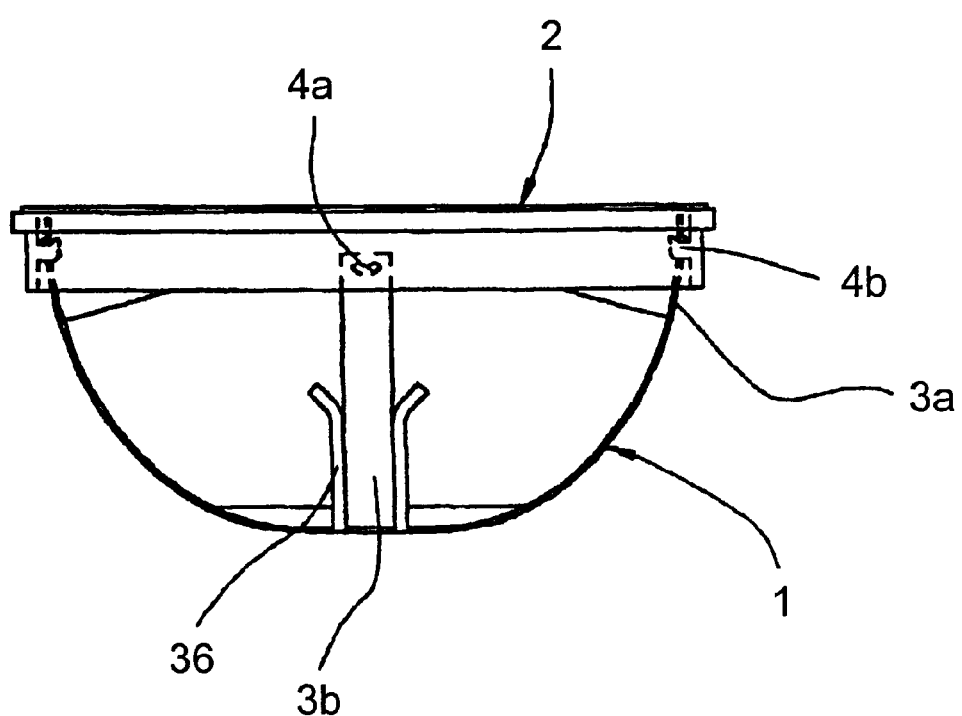
FIG. 11 is an outside view of the actuating mechanism with guides.

FIG. 11 is an outside view of the actuating mechanism, comprising the first element 1, which exhibits slotted guides 36, in which there are friction-adjustable elements 3a, 3b, whose ends are connected to the second element 2 via the connecting points 4b, 4d.

Figure 12:
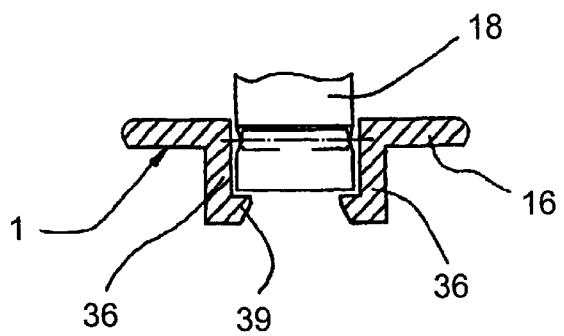
FIG. 12 depicts a first embodiment of a brace.
Figure 13:
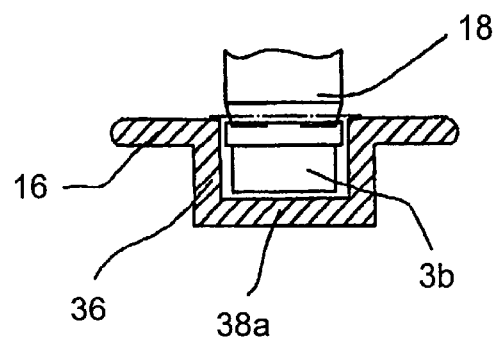
FIG. 13 depicts a second embodiment of a brace.
Figure 14:
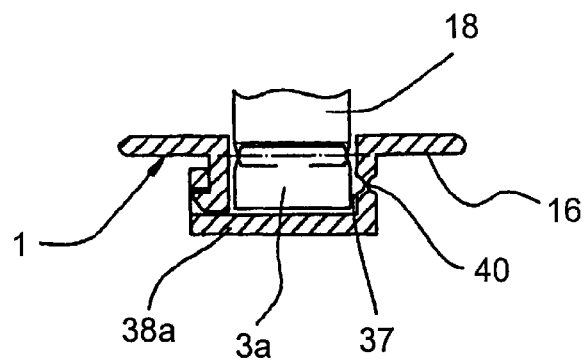
FIG. 14 depicts a third embodiment of a brace.
Figure 15:
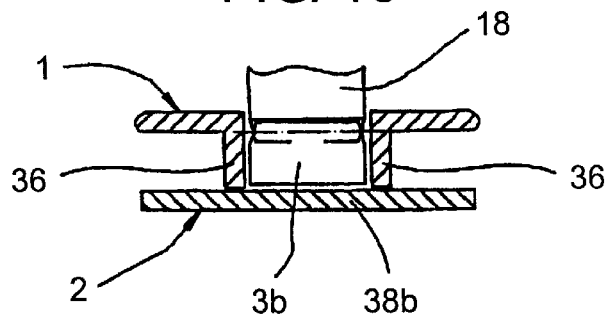
FIG. 15 depicts a fourth embodiment of a brace.

FIG. 12 shows a first embodiment of a bracing for the friction-adjustable element 3a in the shape of snap connections 39 at the ends of guides 36. The snap connections are arranged in the engagement region of the gear mechanism 18 in the toothed region of the friction-adjustable element. FIG. 13 depicts a second embodiment of the bracing 38a, which is designed as a leg, connecting the two guides 36 together. FIG. 14 depicts a third embodiment of the bracing 38a, wherein the leg is connected to one of the guides 36 by means of a film hinge 40 and to a second guide 36 by means of a snap connection as allowed by play area 37. FIG. 15 depicts a fourth embodiment of the bracing, wherein the bracing 38b is one piece with the second element 2.

We claim:

1. Actuating mechanism for a motor vehicle, said actuating mechanism comprising:
   a first element for fastening to a vehicle,
   a second element connected to the first element so as to swivel around at least one axis of rotation, and including a mounting for a manipulatable member, the second element being connected to at least one adjustable element for actuation by a drive between the first and the second element, and to at least one friction element resting against the first element, the at least one friction element and the one adjustable element forming a one piece friction-adjustable element serving as a connecting element between the first and the second element, and the friction-adjustable element being under a tensile load.

2. Actuating mechanism, as claimed in claim 1, wherein the at least one friction-adjustable element is one of a metal band, a composite part, and an engineering plastic part with at least one toothed region.

3. Actuating mechanism, as claimed in claim 2, wherein the toothed region is formed by an impressed toothing.

4. Actuating mechanism, as claimed in claim 2, wherein the toothed region is formed by a perforation.

5. Actuating mechanism, as claimed in claim 2, wherein the toothed region is produced by one of drawing and punching and bending.

6. Actuating mechanism, as claimed in claim 1, wherein the at least one friction-adjustable element is connected to the second element at connecting points.

7. Actuating mechanism, as claimed in claim 1, wherein the manipulatable member is a rearview mirror of a motor vehicle.

8. Actuating mechanism, as claimed in claim 1, wherein in a rigid design, at least one friction-adjustable element escapes sideways with the second element at at least one connecting point.

9. Actuating mechanism, as claimed in claim 1, wherein the second element is swivelable around two axes of rotation and for each axis of rotation, one said friction-adjustable element is provided.

10. Actuating mechanism, as claimed in claim 9, wherein
    two friction-adjustable elements are driven independently of each other,
    each friction-adjustable element being connected to the second element at at least two connecting points, and
    when using two connecting points per friction-adjustable element, one connecting point of the second element with the first friction-adjustable element is followed by a connecting point of the second element with the second friction-adjustable element, whereby the connecting points are spaced uniformly apart at an angle of 90° with respect to an intersection of both axes of rotation,
    each friction-adjustable element encloses the first element; and
    the friction-adjustable elements are guided at least partially in or at the first element.

11. Actuating mechanism, as claimed in claim 10, wherein the two friction-adjustable elements are arranged so that they cannot impede one another.

12. Actuating mechanism, as claimed in claim 10, wherein the two friction-adjustable elements are uniformly spaced apart relative to the intersection of the axes of rotation.

13. Actuating mechanism, as claimed in claim 10, wherein the two friction-adjustable elements move on different rails and at least partially at varying distance from the intersecting point of the axes of rotation.

14. Actuating mechanism, as claimed in claim 1, wherein tensile forces act on the friction-adjustable element when in operation, and in stop condition.

15. Actuating mechanism, as claimed in claim 14, wherein one friction-adjustable element exhibits at least one region that is designed springy.

16. Actuating mechanism, as claimed in claim 15, wherein the springy region is designed in an undulating pattern.

17. Actuating mechanism, as claimed in claim 15, wherein the springy region is completely stretched in an assembled state.

18. Actuating mechanism, as claimed in claim 1, wherein the second element is essentially rigid.

19. Actuating mechanism, as claimed in claim 18, wherein the second element is provided with an annular portion.

20. Actuating mechanism, as claimed in claim 19, wherein the annular portion is moulded with connecting points to the at least one friction-adjustable element.

21. Actuating mechanism, as claimed in claim 20, wherein the connecting points are in the form of a catch, projecting from an interior of the annular portion.

22. Actuating mechanism, as claimed in claim 21, wherein the catches leave the shape of circular segments.

23. Actuating mechanism, as claimed in claim 18, wherein the second element has spring members, to which connecting points between the friction-adjustable elements and the second element are moulded.

24. Actuating mechanism, as claimed in claim 23, wherein the second element has slotted recesses, which form springy mechanisms.

25. Actuating mechanism, as claimed in claim 1, wherein at least one friction-adjustable element is hinged to the second element.

26. Actuating mechanism, as claimed in claim 20, wherein the second element is made essentially as one of an aluminum drawn part, an aluminum cast part or a magnesium diecast part.

27. Actuating mechanism as claimed in claim 1, wherein between the first and the second element there is a swivel bearing, which is held together only by one to two friction-adjustable elements.

28. Actuating mechanism, as claimed in claim 25, wherein between the first element and the second element there is a rotation proof element in the form of a spherical cap provided with guides and grooves.

29. Actuating mechanism, as claimed in claim 1, wherein in a wall of the first element there are recesses, by which gear members of the drive are engaged with the friction-adjustable elements.

30. Actuating mechanism, as claimed in claim 1, wherein the friction-adjusting members are designed flexibly or rigidly at a right angle to a direction of adjustment.

31. Actuating mechanism, as claimed in claim 1, wherein in a flexible design, the friction-adjusting members are fixed with the second element on a side of respective connecting points.

32. Actuating mechanism, as claimed in claim 1, wherein angles of the friction-adjustable elements in extreme positions of the second element can deviate slightly from 90°.

33. Actuating mechanism, as claimed in claim 1, wherein at least one friction-adjustable element is guided in guides on a side of the first element.

34. Actuating mechanism, as claimed in clam 33, wherein the guides are grooves at least in some segments.

35. Actuating mechanism, as claimed in claim 33, wherein the friction-adjustable element is guided in guides on two sides.

36. Actuating mechanism, as claimed in claim 33, wherein at least one friction-adjustable element is positioned in the guides with little play so that it can move lengthwise.

37. Actuating mechanism, as claimed in claim 36, wherein at least one friction-adjustable element in connection with the guide serves as a locking element.

38. Actuating mechanism, as claimed in claim 33, wherein at least one friction-adjustable element is positioned in the guides with definite play so that it can move lengthwise but sideways with little play.

39. Actuating mechanism, as claimed in claim 1, wherein a toothed region of at least the friction-adjustable element faces the first element at approximately 90° thereto.

40. Actuating mechanism, as claimed in claim 39, wherein at least one friction-adjustable element is braced with a bracing member at least in a region of engagement with a gear member.

41. Actuating mechanism, as claimed in claim 40, wherein the bracing element reaches at least partially behind the friction-adjustable element.

42. Actuating mechanism, as claimed in claim 40, wherein the friction-adjustable element is held in a guide by a snap connection.

43. Actuating mechanism, as claimed in claim 42, wherein the snap connection is in die shape of snap hooks.

44. Actuating mechanism, as claimed in claim 42, wherein the guides are one piece with the first element.

45. Actuating mechanism, as claimed in claim 40, wherein the bracing members are one of one piece with the first element or piece with the second element.

46. Actuating mechanism, as claimed in claim 45, wherein the bracing member is connected to the first element with a film hinge.

47. Actuating mechanism, as claimed in claim 1, wherein a spring element is arranged between the first element and the second element.

48. Actuating mechanism, as claimed in claim 47, wherein the spring element pushes the second element away from the first element; and that at least one friction-adjustable element holds the second element against spring action of a spring element at the first element.

49. Actuating mechanism, as claimed in claim 47, wherein the spring element is one of one piece with the first element or the second element, or is an additional spring element.

50. Actuating mechanism, as claimed claim 1, wherein a wall of the first element includes recesses, by which at least one position finder is coupled with the friction-adjustable elements.

51. Actuating mechanism, as claimed in claim 50, wherein one part of the position finder is arranged inside the first element; and a second part is rigidly connected to a friction-adjustable element, with the result that a connection is produced between two parts through the wall of the first element.

52. Actuating mechanism, as claimed in claim 51, wherein the position finder is retrofitted on the first element from outside and connected both mechanically and electrically to said first element.

53. Actuating mechanism, as claimed in claim 52, wherein an electrical connection between the position finder and terminals of a drive is done with sheet metal guides.

54. Actuating mechanism, as claimed in claim 53, wherein the sheet metal guides are formed by injection in the first elements.

\* \* \* \* \*